United States Patent Office 3,330,628
Patented July 11, 1967

3,330,628
HALOGEN REPLACEMENT USING LITHIUM CYANIDE
Iral Brown Johns, Marblehead, Mass., assignor to Monsanto Research Corporation, St. Louis, Mo., a corporation of Delaware
No Drawing. Filed Mar. 29, 1963, Ser. No. 269,178
4 Claims. (Cl. 23—358)

This invention relates to a novel method for the preparation of CN compounds, and more particularly, provides a novel method for the preparation of CN compounds from halogen compounds by reaction with anhydrous lithium cyanide.

The silver halides are generally highly insoluble materials, and when reaction takes place between a halogen compound and a silver salt, the insolubility of the silver halide can cause the metathetical reaction to be driven substantially to completion. Thus at least for laboratory use, the use of silver salts to displace a halogen atom by another anion is frequently found favorable. However, this method is not always successful. The silver cation is rather bulky, which may produce steric hindrance. In any case, whatever the cause, the salts of this element are not always effective reagents for replacement reactions. For example, silver cyanide does not react with boron trichloride nor does it react with chlorodiphenylphosphine oxide in an organic reaction medium.

It is an object of this invention to provide a new method for the replacement of halogen groups by CN groups.

It is a particular object of this invention to provide a novel method for replacing halogen by CN groups employing a metallic cyanide.

These and other objects will become evident upon consideration of the following specification and claims.

It has now been found that halogen substituents of an element of Periods 1 and 2 in Groups III through V of the Periodic Table selected from the class consisting of B, C, Si and P are effectively replaced by a CN substituent when the said halogen-substituted compound is contacted with anhydrous lithium cyanide in an inert liquid organic reaction medium, particularly in a solvent having a high dielectric constant.

Pure anhydrous lithium cyanide has been difficult to prepare, due particularly to its hydrolysis-sensitivity. I have now devised a convenient and effective method for its preparation, as set forth in my copending application S.N. 269,177 filed concurrently herewith, now U.S. Patent 3,189,410.

In anhydrous solvents, pure anhydrous lithium cyanide has been found to react readily with chlorodiphenylphosphine oxide in benzene to yield cyanodiphenylphosphine oxide, while neither potassium cyanide nor silver cyanide react at all. Although boron trichloride does not react with silver cyanide, it reacts vigorously with lithium cyanide, and indeed moderation of the reaction by means of a solvent is necessary to prevent decomposition. Diphenyl dichlorosilane in dimethylformamide reacts vigorously with lithium cyanide to yield a mixture of the cyano and isocyano derivatives, while silver cyanide gives only the isocyano compound as reported by McBride, J. Org. Chem. 24, 2030 (1959). Further, in addition to the stated types of compounds, it is found that the anhydrous lithium cyanide will displace halogen from a carbon compound, providing organic nitriles.

Thus, the presently provided method may be employed advantageously to achieve replacement reactions forming nitrile products not available otherwise from reaction of the halides with the cyanides of higher atomic weight metals of Group I of the Periodic Table. Additionally, its use to displace halogen from halides generally may be advantageous by reason of the entirely anhydrous reaction system which may be maintained, relatively moderate temperatures which may be employed, and so forth.

Referring now further in detail to the application of the method of this invention, it may be employed to displace the halogen substituents of boron halides such as boron trichloride and alkyl dichloroborinates such as methyl dichloroborinate, ethyl dichloroborinate, n-butyl dichloroborinate, 2-chloroethyl dichloroborinate, 3-chloropropyl dichloroborinate and the like; or dialkyl chloroboronates such as di-n-butyl chloroboronate and also cyclic boron esters such as ethylene chloroborinate and so forth. The aromatic esters of boron substituted with chlorine may also be employed in the present method. Exemplary of these are diphenyl chloroboronate and phenyl dichloroborinate, o-nitrophenyl dichloroborinate and o-phenylene chloroboronate. Another class of boron compounds presently contemplated as subject to the replacement method of this invention for forming nitriles are the organoboron compounds such as phenylboron dichloride, phenylboron dibromide, phenoxyphenylboron dibromide, n-butylboron dichloride, n-butyl phenylchloroborinate, n-butyl-n-butylchloroborinate, n-butyl phenylbromoborinate, di-n-butylboron chloride, di-n-butylboron bromide, di-n-butylboron iodide, dimethylboron chloride, dimethylboron bromide, diethylboron chloride, diethylboron bromide, diphenylboron chloride, diphenylboron bromide, 1,2-bis(dichloroboryl)ethane, isopropylboron dichloride, t-butylboron dichloride, cyclohexylboron dichloride, bis(dichloroboryl)butane, di-n-propylboron iodide and so forth.

Proceeding to a consideration of the Group IV elements, the method of the present invention has utility in displacing reactive halogen from C atoms with a CN group. It is known that halogen in organic halo compounds varies greatly in its mobility i.e., its labile character, depending on the structure and the character of the compound and the position the halogen occupies in the molecule. In general, negative groups attached to the carbon atom bearing the halogen atom activate the halogen. Carbinol, carbonyl, carboxyl, alkoxy, cyanomethyl and vinyl groups also cause activation of the halogen. Bromine in organic compounds is more reactive than chlorine.

A wide variety of organic compounds may usefully be converted to nitriles in accordance with the present invention. Exemplary thereof are, for example, benzyl chloride, benzyl bromide, biphenylmethyl chloride, naphthalenemethyl chloride, phenanthrenemethyl chloride, naphthalenemethyl bromide, toluenemethyl chloride, 2,5-dimethylbenzyl chloride, diphenylmethyl chloride, trityl chloride, α-propylbenzyl chloride, 1,1-diphenylisopropyl dichloride, ethylene chlorohydrin, chloroacetone, bromoacetone, α-bromoacetophenone, benzoylbromoacetonitrile, bromoacetoacetone, methyl bromoacetylbenzoate, ethylene dibromide, ethyl chloroacetate, methyl bromoacetate, diethyl chlorosuccinate, 1-chloroethyl acetate, chloroacetonitrile, nitrobenzyl chloride, tricyanogen chloride and so forth.

Proceeding to a consideration of the silane compounds, the present method can be applied to silicon halides such as silicon tetrachloride, iodosilicon trichloride and the like, to oxyhalosilanes such as triethoxychlorosilane, ethoxytrichlorosilane, and diethoxydichlorosilane, to alkylhalosilanes such as dimethyldichlorosilane, and also aromatic compounds such as phenyltrichlorosilane, diphenyldichlorosilane, phenyldibromosilane, tolyltrichlorosilane, tolylbromodichlorosilane, biphenyltrichlorosilane, (ethylphenyl)trichlorosilane, cumyltrichlorosilane, phenylmethyldichlorosilane, mesityltrichlorosilane and so forth.

Referring to phosphorus halides which may be cyanided in accordance with the present invention, these may be (nomenclature as used in Kosolapoff, "Organophosphorus Compounds," Wiley, 1950) the trihalophosphines such as phosphorus trichloride and phosphorus tribromide dihalophosphines and mohohalophosphines such as dichloroethylphosphine,
dichloropropylphosphine,
dichloroisopropylphosphine,
dichlorobutylphosphine,
dibromobutylphosphine,
dichlorophenylphosphine,
dibromophenylphosphine,
dichloro(p-chlorophenyl)phosphine,
dichloro(dimethylaminophenyl)phosphine,
dichloro(p-diethylaminophenyl)phosphine,
dichloro(p-ethoxyphenyl)phosphine,
dichloro(p-phenoxyphenyl)phosphine,
dichlorobenzylphosphine,
dichlorotolyphosphine,
dibromo-p-tolyphosphine,
dichloroxylylphosphine,
dichloro(p-isopropylphenyl)phosphine,
dibromonaphthylphosphine,
bromoethylmethylphosphine,
bromodiethylphosphine,
bromodipropylphosphine,
chlorodibutlyphosphine,
chloromethylphenylphosphine,
bromomethylphenylphosphine,
bromoethylphenylphosphine,
chlorobis(chlorophenyl)phosphine,
bromobis(nitrophenyl)phosphine,
bromophenyltolylphosphine,
chloroditolylphosphine,
chlorodinaphthylphosphine,
bromodinaphthylphosphine and so forth.

Particularly contemplated are the pentavalent phosphorus halides such as triphenylphosphorous dibromide, trinaphthylphosphorus dibromide, diethylphenylphosphorus dichloride and so forth;
methylphosphonyl dichloride,
propylphosphonyl dichloride,
cyclohexanephosphonyl dichloride,
dipropylphosphonyl chloride,
dibutylphosphonyl chloride,
phenylphosphonyl dichloride,
chlorophenylphosphonyl dichloride,
tolylphosphonyl dichloride,
biphenylphosphonyl dichloride,
diphenylphosphonyl chloride,
bis(nitrophenyl)phosphonyl chloride,
ethylthionophosphonyl dichloride,
diethylthionophosphonyl chloride,
phenylthionophosphonyl dichloride,
ethylphenylthionophosphonyl chloride,
diphenylthionophosphonyl chloride,
bis(nitrophenyl)thionophosphonyl chloride and dinaphthylthionophosphonyl chloride and so forth.

Another class of contemplated phosphorus compounds are the halophosphites such as isobutyl dibromophosphite and diphenyl bromophosphite, butyl dichlorophosphite and phenyl dichlorophosphite, ethylene chlorophosphite, trimethylene chlorophosphine and phenylene chlorophosphite, besides halophosphates and halothiophosphates such as methyldichlorophosphate,
butyl dichlorophosphate,
methyl dichlorothionophosphate,
propyl dichlorothionophosphate,
diisopropylchlorophosphate,
diethyl chlorothionophosphate,
phenyl dichlorophosphate,
tolyl dichlorophosphate,
biphenyl dichlorophosphate,
diphenyl chlorophosphate,
bis-t-butylphenyl chlorophosphate and so forth.

Still another class of halogen derivatives of phosphorus contemplated herein are the aminohalophosphites and phosphates such as ethylamidodichlorophosphite,
dipropylamidodichlorophosphite,
amylamidodichlorophosphate,
nitrophenylamidodichlorophosphate,
dimethylamidodichlorophosphate and so forth.

In accordance with this invention, the replaceable halogen substituent of the element of Periods I and II in Groups III through V of the Periodic Table is replaced by a CN substituent. By this is meant replacement by either a cyano or an isocyano group, the attachment coming either from the carbon or from the nitrogen, respectively. Also, the displacement of the halogen group may or may not be accompanied by further reactions such as isomerization, formation of higher molecular weight compounds, and the like. As will be appreciated by those skilled in the art, in many cases it is observed that displacement of a halogen atom by a CN group is accompanied by such additional transformations, producing anomalous products. Thus for example, in the replacement of the halogen atoms of boron trichloride, I fail to obtain the baron tricyanide described in the literature, but instead produce a higher melting compound which is apparently a CN compound of B having a rearranged structure. This kind of product is also obtained, in part, on treatment of chlorodiphenylphosphine oxide with the anhydrous lithium cyanide.

In conducting the replacement of halogen with a CN group in accordance with this invention, anhydrous lithium cyanide will be contacted with the halogen compound in an inert liquid organic reaction medium. Useful fluids are diluents and solvents dissolving the halogen compound, the lithium cyanide or both. Oxygenated solvents are useful, inclding alcohols such as methyl, ethyl, propyl, isopropyl, and butyl alcohols and the like, and ethers such as diethyl ether, dioxane, and the dimethyl ether of ethylene glycol, as are hydrocarbon solvents, particularly aromatic hydrocarbons such as benzene and toluene. Still more preferably, solvents having a relatively high dielectric constant for an organic solvent, such as, say, approaching or exceeding a value of 10, may be employed. Exemplary of such solvents with high dielectric constants are nitriles such as acetonitrile, amides such as dimethyl formamide and dimethylacetamide, sulfoxides such as dimethyl sulfoxide, tertiary bases such as pyridine and triethylamine, and so forth.

The ratios of the reactants, the halogen-substituted compound and the lithium cyanide, are not critical. In general, stoichiometric ratios for replacement of the desired number of halogen atoms will desirably be approximated, but either the halogen or the cyanide compound can be employed in excess, such as up to about a tenfold molar excess.

To accelerate the rate of reaction when desired, heating may be employed. Temperatures used may vary from down to where the reaction mixture is baerly liquid to up to below decomposition temperatures of the reaction mixture components. The rapidity of the reaction will vary with the reactants chosen and in some cases the reaction may be exothermic and require cooling and/or diluents to moderate its violence while other pairs of reactants may not react completely until after refluxing at elevated temperatures. Suitable temperatures for carrying out the reactions will generally be in the range of about 25° to 125° C. Pressures may be atmospheric or range from subatmospheric pressures down to say about 0.5 mm. Hg to superatmospheric pressures, up to say about 5,000 p.s.i. The time required to accomplish the reaction depends on functional factors such as the reactivity of the reactants, the temperature of reaction, and so forth. Reaction rates and times of reaction may vary considerably also depending on the details of apparatus and other operational conditions. By suitable arrangements continuous procedures may be employed, or batch type operations.

On completion of the reaction, the product formed upon displacement of the halogen by the CN group is separated by conventional methods such as precipitation, vaporization, distillation, extraction and the like.

The invention is illustrated but not limited by the following examples.

Example 1

This example illustrates the production of a normal cyano derivative by replacement of a halogen of an organic halogen compound through reaction with lithium cyanide.

A solution of 6.0 grams (g.) of ω-bromoacetophenone dissolved in 5 cubic centimeters (cc.) of dimethylformamide is added to 2.2 g. of lithium cyanide suspended in 20 cc. of dimethylformamide. The reaction flask requires water cooling to moderate the exotherm. After this has subsided, the reaction mixture is heated to about 80° C. for about 20 minutes and thereafter let cool. Addition of 200 cc. of water produces a yellow suspension. The reaction mixture is just barely acidified with hydrogen chloride. A white precipitate forms. The reaction mixture is extracted with benzene, which is dried and then the solvent is distilled off. A sample of the residue recrystallized from 50% aqueous methanol and then twice from water melts at 80.5–80.7° C. (literature melting point of benzoylacetonitrile 80.5–81°). The infrared spectrum confirms the assigned structure.

Example 2

This example illustrates displacement of a halogen atom from a phosphorus atom with lithium cyanide.

About 3.3 g. of lithium cyanide are placed in a flask and 10–15 milliliters (ml.) of anhydrous benzene are added. Then 23.5 g. of chlorodiphenylphosphine oxide in 10–15 ml. of benzene are gradually added. The reaction mixture is refluxed overnight and then cooled. The filtrate is separated and the solvent is distilled off. Subsequent distillation gives a product weighing 5.3 g. and boiling at 156–159° C./1.2 mm., which is a mixture of chlorodiphenylphosphine oxide and cyanodiphenylphosphine oxide. The residue in the distillation flask has the same composition and infrared spectrum as the cyano compound, but is not distillable.

Example 3

This illustrates another displacement of halogen from phosphorus by lithium cyanide.

A mixture of 3.3 g. of lithium cyanide and 23.6 g. of chlorodiphenylphosphine oxide in 25 ml. dry benzene is prepared (exothermic reaction) and let stand overnight at room temperature (about 25° C.). The next day the reaction mixture is refluxed for 6 hours and then cooled and filtered. The filtrate is stripped of solvent to atmospheric pressure and then vacuum distilled at 131–134°/0.15 mm. The dark brown solid product has the characteristics of the cyano compound described in Example 2.

Example 4

This example illustrates still another reaction of lithium cyanide with a phosphorus compound.

To a solution of 23.6 g. of chlorodiphenylphosphine oxide in acetonitrile is added 3.3 g. of lithium cyanide. The reaction turns brown as the addition is made. After refluxing overnight the reaction mixture (dark brown and almost black in color) is filtered and distilled. The distillation yields first the solvent, and then a small amount of unreacted chorodiphenylphosphine oxide. The main fraction is non-distillable and is dissolved in benzene and precipitated with petroleum ether. A dark brown solid is recovered which melts at 110–120° and has an analysis corresponding to cyanodiphenylphosphine oxide, which is the same product as is obtained when benzene is employed as solvent.

Example 5

This example illustrates the reaction of a boron halide with lithium cyanide.

A vapor of boron trichloride is introduced into a tube charged with 3.2 g. of lithium cyanide. The lithium cyanide darkens in color as it reacts with the boron trichloride and the reaction is very exothermic, requiring cooling by ice bath. When 3.8 g. of the boron trichloride have been introduced, the reaction flask is sealed and left standing in an ice water bath for forty hours. It is then heated in an oil bath to 100–110°. The resulting product fails to sublime at 150–160° C. under high vacuum. The solid product is dark brown, weighs 7.3 g., has a melting point above 360° C., and is a mixture of lithium chloride and the cyano boron compound.

Example 6

This example illustrates reaction of lithium cyanide with a silane halide.

To a solution of 6.8 g. of lithium cyanide in about 100 g. of dried benzene is added 25 g. of diphenyldichlorosilane in 25 ml. of benzene. After standing at room temperature for a quarter of an hour, a slight exothermic reaction begins and a fluffy white solid precipates. After standing at room temperature for ½ hour, the reaction mixture is heated to reflux overnight, during which it finally turns quite dark. The resulting reaction mixture is filtered and the insoluble residue washed with several portions of benzene. The filtrate and benzene washings are distilled, providing a fraction weighing 15.8 g., boiling at 118–122°/0.28 mm. The properties and analysis of this compound agree with those reported by McBride, J. Org. Chem. 24, 2030 (1959) for diphenyl silicon diisocyanide. The infrared spectrum shows that the compound contains both cyano and isocyano groups.

While the invention has been described with reference to specific preferred embodiments thereof, it is to be appreciated that modifications and variations can be made without departing from the scope of the invention, which is limited only as defined in the appended claims.

What is claimed is:

1. The method of displacing a labile halogen substituent of a compound and replacing said halogen substituent with a CN substituent which comprises contacting a halogen-substituted compound selected from the class consisting of boron trichloride, diphenyldichlorosilane and chlorodiphenylphosphine oxide with anhydrous LiCN in an inert liquid organic reaction medium.

2. The method of claim 1 in which said halogen-substituted compound is boron trichloride.

3. The method of claim 1 in which said halogen-substituted compound is diphenyldichlorosilane.

4. The method of claim 1 in which said halogen-substituted compound is chlorodiphenylphosphine oxide.

(References on following page)

References Cited

UNITED STATES PATENTS

| | | | |
|---|---|---|---|
| 2,974,164 | 3/1961 | Franz | 260—545 |
| 3,032,575 | 5/1962 | Freitag et al. | 260—448.2 |
| 3,049,406 | 8/1962 | Grant et al. | 23—89 |

FOREIGN PATENTS 847,803  9/1960  Great Britain.

OTHER REFERENCES

Houben-Weyl, Methoden der Organischen Chemie, vol. 8, 1952, pp. 290–305 (pp. 290–294 relied upon).

Sidgwick, Chemical Elements and Their Compounds, vol. 1, 1950, pp. 101–102.

LORRAINE A. WEINBERGER, *Primary Examiner.*

S. H. BLECH, B. EISEN, H. C. WEGNER,
*Assistant Examiners.*